US010551526B2

(12) United States Patent
Kim et al.

(10) Patent No.: US 10,551,526 B2
(45) Date of Patent: Feb. 4, 2020

(54) RADIOSONDE AIR TEMPERATURE MEASUREMENT CORRECTION SYSTEM AND METHOD

(71) Applicant: Korea Research Institute of Standards and Science, Daejeon (KR)

(72) Inventors: Yong-Gyoo Kim, Daejeon (KR); Byung Il Choi, Daejeon (KR); Jong Cheol Kim, Daejeon (KR); Sang Bong Woo, Daejeon (KR); Sang Wook Lee, Daejeon (KR); Su Yong Kwon, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 210 days.

(21) Appl. No.: 15/306,697

(22) PCT Filed: Jul. 8, 2015

(86) PCT No.: PCT/KR2015/007050

§ 371 (c)(1),
(2) Date: Oct. 25, 2016

(87) PCT Pub. No.: WO2017/002999

PCT Pub. Date: Jan. 5, 2017

(65) Prior Publication Data

US 2017/0192127 A1 Jul. 6, 2017

(30) Foreign Application Priority Data

Jun. 29, 2015 (KR) ........................ 10-2015-0092093

(51) Int. Cl.
*G01W 1/08* (2006.01)
*G01K 7/02* (2006.01)
(Continued)

(52) U.S. Cl.
CPC ................. *G01W 1/08* (2013.01); *G01J 1/00* (2013.01); *G01J 5/007* (2013.01); *G01J 5/12* (2013.01);
(Continued)

(58) Field of Classification Search
CPC ...... G01J 1/00; G01J 5/12; G01J 5/20; G01K 1/00; G01K 7/02; G01K 7/16; G01K 13/00; G01W 1/04; G01W 1/08; G01W 1/18
(Continued)

(56) References Cited

U.S. PATENT DOCUMENTS 4,618,776 A * 10/1986 Sturm ................. G01N 17/004 250/372
5,511,417 A * 4/1996 Paukkunen ............ G01N 25/56 73/29.01
(Continued)

FOREIGN PATENT DOCUMENTS

| | | |
|---|---|---|
| KR | 1020090056492 | 6/2009 |
| KR | 101045827 | 6/2011 |
| KR | 101237324 B1 | 2/2013 |

OTHER PUBLICATIONS

Luers, James K., "Temperature Corrections for the VIZ and Vaisala Radiosondes", Jun. 1995, Journal of Applied Meteorology, vol. 34, pp. 1241-1253.*

(Continued)

*Primary Examiner* — Peter J Macchiarolo
*Assistant Examiner* — Jermaine L Jenkins
(74) *Attorney, Agent, or Firm* — Perkins IP Law Group LLC; Jefferson Perkins

(57) ABSTRACT

The present disclosure relates to an apparatus embodied in order to correct efficiently changing of measured temperature value in a temperature sensor according to influence of
(Continued)

irradiance. A radiosonde related an exemplary embodiment of the present disclosure includes a first temperature sensor; a second temperature sensor having higher emission ratio than the first temperature sensor; and a measuring unit in order to calculate corrected temperature value, but the radiosonde and the third temperature sensor are installed in a chamber before flying of the radiosonde, a first temperature change detected by the first temperature sensor by output light in a sunlight simulator and a second temperature change detected by the second temperature sensor are induces, compensation factors may be derived using the first temperature change, the second temperature change, and temperature value measured by the third temperature sensor.

7 Claims, 4 Drawing Sheets

(51) Int. Cl.

| | |
|---|---|
| ***G01K 7/16*** | (2006.01) |
| ***G01K 13/00*** | (2006.01) |
| ***G01W 1/18*** | (2006.01) |
| ***G01J 5/20*** | (2006.01) |
| ***G01J 5/12*** | (2006.01) |
| ***G01J 1/00*** | (2006.01) |
| ***G01W 1/04*** | (2006.01) |
| ***G01J 5/00*** | (2006.01) |

(52) U.S. Cl.
CPC .................. *G01J 5/20* (2013.01); *G01K 7/02* (2013.01); *G01K 7/16* (2013.01); *G01K 13/00* (2013.01); *G01W 1/04* (2013.01); *G01W 1/18* (2013.01); *G01J 2005/0051* (2013.01)

(58) Field of Classification Search
USPC ........ 73/170.28; 702/3; 340/870.1; 374/109, 374/121, 126, 133, 134, 136
See application file for complete search history.

(56) References Cited

U.S. PATENT DOCUMENTS

| | | | | |
|---|---|---|---|---|
| 5,954,430 | A | 9/1999 | Turtiainen et al. | |
| 9,784,887 | B1* | 10/2017 | Ulmer | G01W 1/02 |
| 2008/0072669 | A1 | 3/2008 | Paukkunen | |
| 2010/0156663 | A1* | 6/2010 | Pal | G01W 1/08 340/870.1 |
| 2010/0191496 | A1 | 7/2010 | Von Bagh et al. | |
| 2016/0003975 | A1* | 1/2016 | Salo | G01W 1/08 73/170.28 |

OTHER PUBLICATIONS

Schmidlin, F. J., "Preliminary Estimates of Radiosonde Thermistor Errors", Sep. 1986, NASA Technical Paper 2637, pp. 1-15.*

Ruffieux, Dominique, "Influence of Radiation on the Temperature Sensor Mounted on the Swiss Radiosonde", 2003, Journal of Atmospheric and Oceanic Technology, vol. 20, pp. 1576-1582.*

* cited by examiner

[FIG. 1]
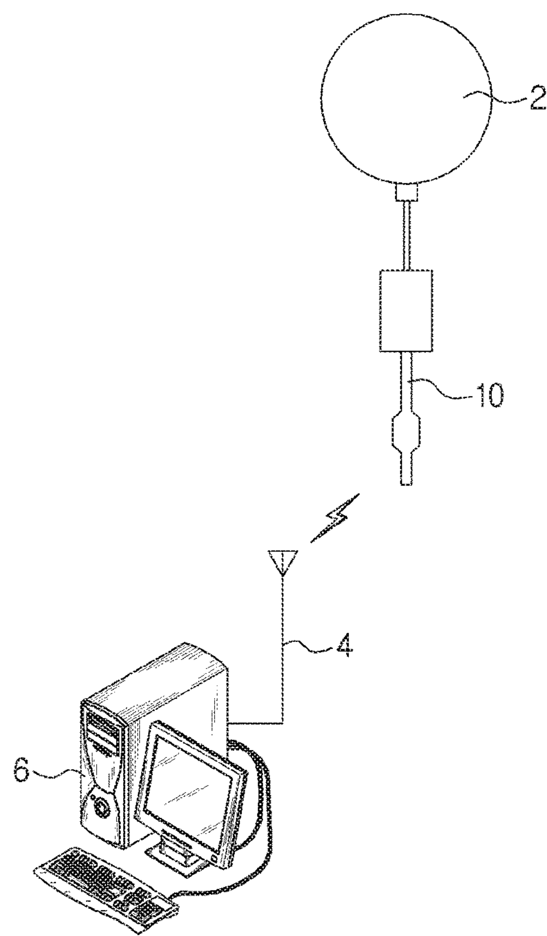
[FIG. 2]
10

[FIG.3]
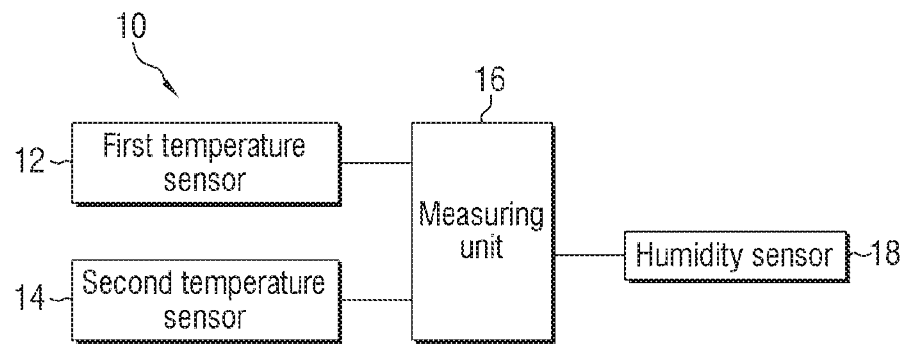
[FIG.4]
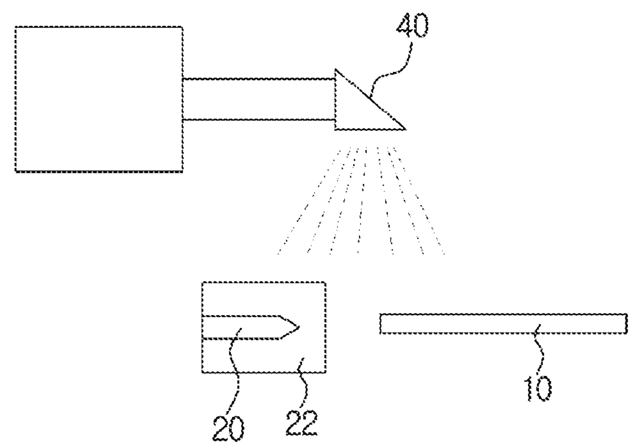
[FIG. 5]
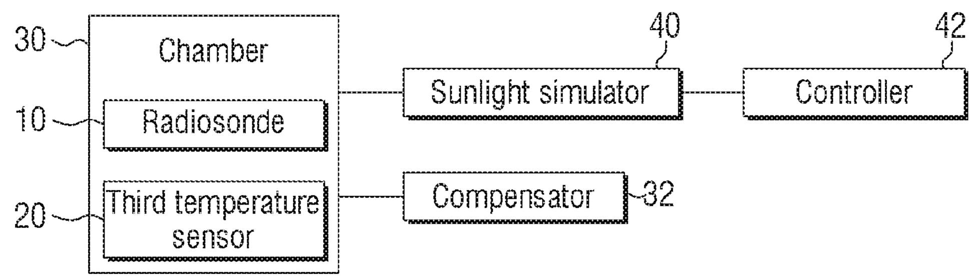

[FIG. 6]
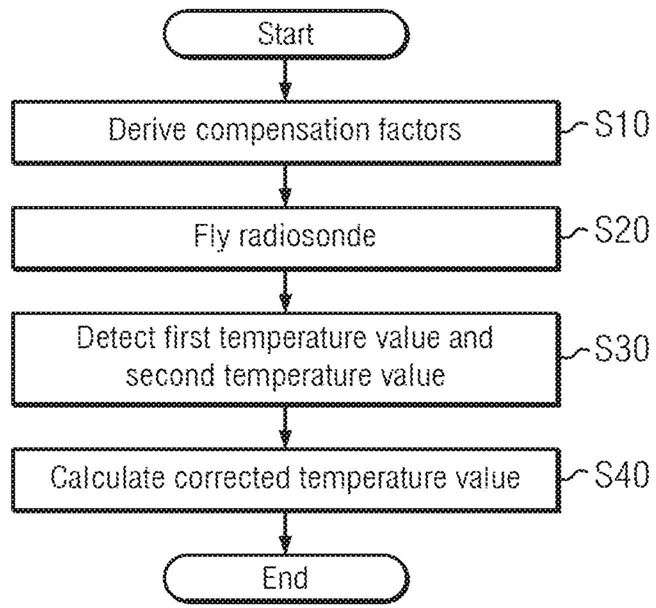
[FIG. 7]
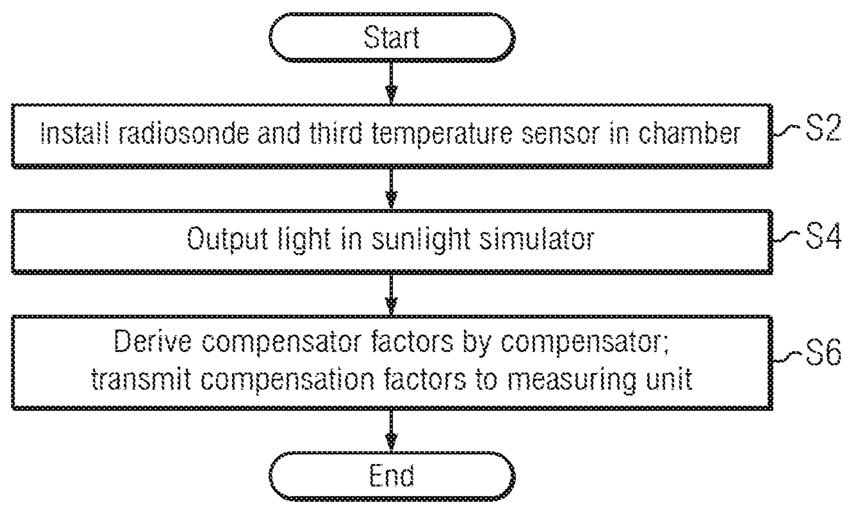

[FIG.8]
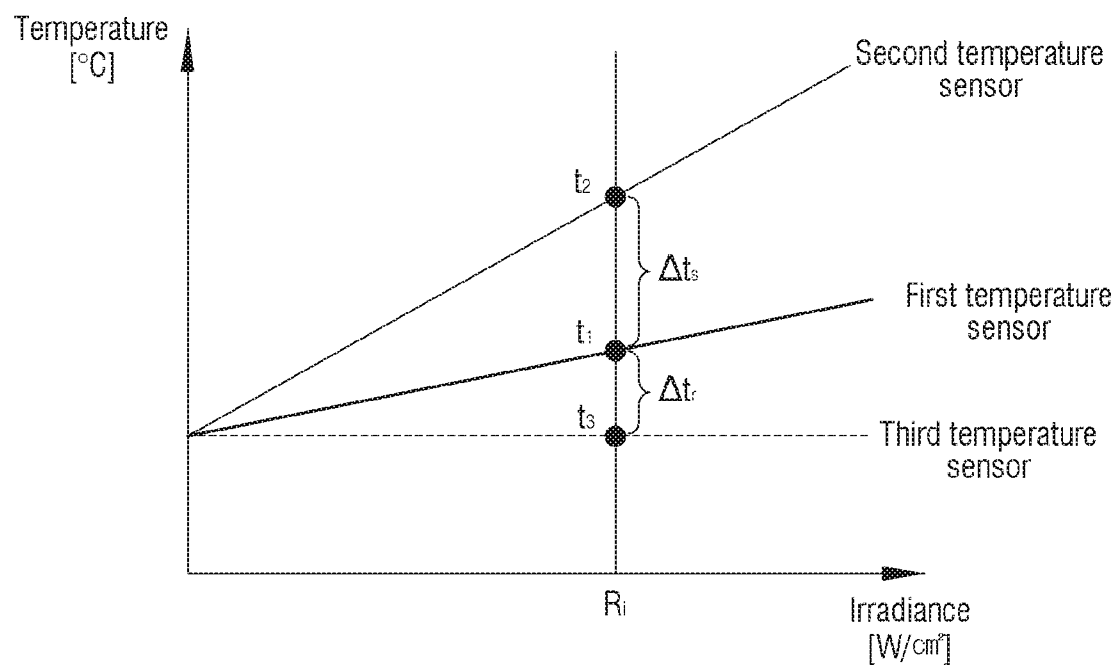

RADIOSONDE AIR TEMPERATURE MEASUREMENT CORRECTION SYSTEM AND METHOD

TECHNICAL FIELD

The present invention relates to a radiosonde furnished with multiple temperature sensors and, more particularly, relates to an apparatus and method embodied to allow variation due to the effect of radiation intensity on temperature values measured by the temperature sensors to be corrected efficiently.

BACKGROUND ART

The atmosphere surrounding a surface of the Earth has a great influence on human life. Among the observation apparatuses used for understanding the structure and change of the atmosphere, a radiosonde is the observation apparatus mounted with temperature, humidity, and GPS sensors which is suspended from a balloon and sent into the atmosphere, and which then understands the upper air condition by receiving observation data transmitted from the observation apparatus at a regular interval of time.

The radiosonde measures directly the temperature, pressure, and humidity, etc., by flying in the atmosphere, and the wind is calculated by understanding flying distance of the balloon for a period of time. As a method of understanding a location of the radiosonde, Long Range Navigation (Loran) and Global Positioning System (GPS) have been widely used.

For example, a lower atmosphere ascending/descending-type experimental observation apparatus, disclosed in Korean Patent No. 10-1045827, allows accurate observation results to be known when temperature, humidity, etc. are observed through various sensors and output to the ground.

A conventional radiosonde usually uses only one temperature sensor. Such a radiosonde is continuously subjected to energy irradiated from the sun while flying as high as the stratosphere. In this process, undesirable temperature rises due to the irradiance may occur, but a method of correcting risen temperature due to the irradiance was not developed in the related art, so the temperature cannot be measured accurately.

A method of using a pyrheliometer may be considered. That is, a method of measuring solar irradiance of particular area and particular time using the pyrheliometer, and then using it as a correction value may be applied. However, the irradiance is to be changed according to area, time, and weather condition; therefore this method is considered as a temporary method. In addition, the pyrheliometer is a relatively expensive instrument; therefore using the pyrheliometer is economically infeasible in an aspect of cost.

Accordingly, development of an accurate method of correcting rising temperature in the radiosonde according to the irradiance is required.

DISCLOSURE

Technical Problem

The present disclosure is directed to providing an apparatus and a method of efficiently correct changing of the temperature measured in the temperature sensor according to influence of the irradiance using the radiosonde provided plurality of the temperature sensors.

Specifically, the present disclosure provides an apparatus and a method installing same typed two temperature sensors by coating material having different emission ratio, and correcting of the temperature change according to the irradiance using difference of temperature value measured in the two temperature sensors to users.

In addition, the present disclosure provides an apparatus and a method that can compensate the influence of the irradiance regardless of the area, time, and weather condition by applying thereof after observing the temperature difference of the two temperature sensors which are occurred according to the irradiance in advance, and can realize very high precision to users.

Meanwhile, technical objects to be achieved in the present disclosure are not limited to the aforementioned technical objects, and other not-mentioned technical objects will be obviously understood by those skilled in the art from the description below.

Technical Solution

A radiosonde related to an exemplary embodiment of the present disclosure includes, a first temperature sensor; a second temperature sensor having higher emission ratio than the first temperature sensor; and a measuring unit for calculating a corrected temperature value, but, in order to calculate predetermined compensation factors related to calculate the corrected temperature value, the radiosonde and a third temperature sensor are installed in a chamber before flying of the radiosonde, a sunlight simulator outputs light in the chamber, output light by the sunlight simulator induces a first temperature change detected by the first temperature sensor and a second temperature change detected by the second temperature sensor, a compensator derives the compensation factors using temperature value measured by the first temperature change, the second temperature change, and the third temperature sensor, the third temperature sensor is to be configured to block out light blazed from outside, compensation factors derived from the compensator are transmitted to the measuring unit, and the measuring unit may use the transmitted compensation factors for calculating of the corrected temperature value.

In addition, in the case of flying the rasiosonde, detecting the first temperature value using the first temperature sensor, and detecting the second temperature value using the second temperature sensor, the measuring unit may calculate the corrected temperature value from the first temperature value and the second temperature value using the compensation factors.

In addition, in order to derive the compensation factors, illumination of light output in the sunlight simulator may be changed within predetermined testing scope.

Also, the compensator may observe temperature value detected by the first temperature sensor in arbitrary a first illumination within the testing scope, temperature value detected by the second temperature sensor and temperature value detected by the third temperature sensor.

In addition, the compensator calculate a relational expression related to temperature change detected in the first temperature sensor according to illumination of the light output in the sunlight simulator and a relational expression related to temperature value detected in the second temperature sensor based on the observation result, and the calculated relational expressions may be used in derivation of the compensation factors.

Also, the temperature value detected by the first temperature sensor observed by the compensator in the first illumination is determined according to the following formula 1.

$$t_1=t_3+a+b\times R_i \qquad \text{Formula 1}$$

In the above formula 1, $t_1$ is temperature value detected by the first temperature sensor in the first illumination, $t_3$ is temperature value detected by the third temperature sensor, a is one of the compensation factors, b is one of the compensation factors, and $R_i$ is the first illumination.

In addition, temperature value detected by the second temperature sensor observed by the compensator in the first illumination is determined according to the following formula 2.

$$t_2=t_1+c+d\times R_i \qquad \text{Formula 2}$$

In the above formula 2, $t_2$ is temperature value detected by the second temperature sensor in the first illumination, c is one of the compensation factors, and d is one of the compensation factors.

In addition, the compensator may derive the compensation factors a, b, c, and d using the formula 1 and the formula 2.

Also, the measuring unit may calculate the corrected temperature value using the following formula 3.

$$T_{air}=T_1-\left\{a+b\left(\frac{T_2-T_1-c}{d}\right)\right\} \qquad \text{Formula 3}$$

In the above formula 3, $T_{air}$ is the corrected temperature value, $T_1$ is the first temperature value, and $T_2$ is the second temperature value.

Meanwhile, in a measuring method of a radiosonde provided a first temperature sensor and a second temperature sensor having higher emission ratio than the first temperature sensor, a measuring method related to an exemplary embodiment of the present disclosure, a first step deriving compensation factors; a second step flying the radiosonde; a third step detecting a first temperature value using the first temperature sensor and detecting a second temperature value using the second temperature sensor; and a fourth step that measuring unit of the radiosonde calculates the corrected temperature value from the first temperature value and the second temperature value using the compensation factors; are included, but the first step further includes step 1-1 installing a third temperature sensor configured to block out the radiosonde and light blazed from outside in the chamber; step 1-2 outputting the light in the chamber using a sunlight simulator; step 1-3 that compensator derives predetermined compensation factors related to calculation of the corrected temperature value; and step 1-4 transmitting compensation factors derived from the compensator to the measuring unit; the output light by the sunlight simulator in the step 1-2 induces a first temperature change detected by the first temperature sensor and a second temperature change detected by the second temperature sensor, in the step 1-3, the compensator may derive using the first temperature change, the second temperature change, and temperature value measured by the third temperature sensor.

In addition, in the step 1-2, illumination of light output in the sunlight simulator may be changed within predetermined testing scope.

In addition, the compensator may observe temperature value detected by the first temperature sensor in arbitrary a first illumination within the testing scope, temperature value detected by the second temperature sensor, and temperature value detected by the third temperature sensor.

Meanwhile, a correction system related to an exemplary embodiment of the present disclosure includes a radiosonde provided the first temperature sensor and the second temperature sensor having the higher emission ratio than the first temperature sensor; the third temperature sensor configured to block out the light blazed from the outside; the chamber installing the radiosonde and the third temperature sensor therein; the sunlight simulator outputting the light in the chamber; and the compensator deriving the predetermined compensation factors related to calculate the corrected temperature value; but the light output by the sunlight simulator induces the first temperature change detected by the first temperature sensor and the second temperature change detected by the second temperature sensor, and the compensator may derive the compensation factors using the first temperature change, the second temperature change and the temperature value measured by the third temperature sensor.

In addition, the radiosonde may further include a measuring unit which is transmitted compensation factors derived from the compensator, and calculating the corrected temperature value using the transmitted compensation factors.

In addition, in the case of flying the radiosonde, detecting the first temperature value using the first temperature sensor, and detecting the second temperature value using the second temperature sensor, the measuring unit may calculate the first temperature value and the corrected temperature value from the second temperature value using the compensation factors.

Also, a controller controlling output of the sunlight simulator is further included, but the controller may change illumination of the light output in the sunlight simulator within the predetermined testing scope in order to derive the compensation factors.

In addition, the compensator may observe the temperature value detected by the first temperature sensor in the arbitrary first illumination within the testing scope, the temperature value detected by the second temperature sensor, and the temperature value detected by the third temperature sensor.

In addition, the compensator calculate the relational expression related to temperature change detected in the first temperature sensor according to illumination of the light output in the sunlight simulator and the relational expression related to temperature value detected in the second temperature sensor based on the observation result, and the calculated relational expressions may be used in derivation of the compensation factors.

Also, the temperature value detected by the first temperature sensor observed by the compensator in the first illumination is determined according to the following formula 1.

$$t_1=t_3+a+b\times R_i \qquad \text{Formula 1}$$

In the above formula 1, $t_1$ is the temperature value detected by the first temperature sensor in the first illumination, $t_3$ is the temperature value detected by the third temperature sensor, a is one of the compensation factors, b is one of the compensation factors, and $R_i$ is the first illumination.

In addition, the temperature value detected by the second temperature sensor observed by the compensator in the first illumination is determined according to the following formula 2.

$$t_2=t_1+c+d\times R_i \qquad \text{Formula 2}$$

In the above formula 2, $t_2$ is the temperature value detected by the second temperature sensor in the first illumination, c is one of the compensation factors, and d is one of the compensation factors.

In addition, the compensator may derive the compensation factors a, b, c, and d using the formula 1 and the formula 2.

Also, the measuring unit may calculate the corrected temperature value using the following formula 3.

$$T_{air} = T_1 - \left\{a + b\left(\frac{T_2 - T_1 - c}{d}\right)\right\} \quad \text{Formula 3}$$

In the above formula 3, $T_{air}$ is the corrected temperature value, $T_1$ is the first temperature value, and $T_2$ is the second temperature value.

Meanwhile, a correction method related to an exemplary embodiment of the present disclosure includes a first step installing the radiosonde and the third temperature sensor in the chamber; a second step outputting the light in the chamber using the sunlight simulator; and a third step deriving the predetermined compensation factors related to calculate the corrected temperature value in the compensator; but the radiosonde is provided the first temperature sensor and the second temperature sensor having the higher emission ratio than the first temperature sensor, and the third temperature sensor is configured to block out the light blazed from outside, the light output by the sunlight simulator induces the first temperature change detected by the first temperature sensor and the second temperature change detected by the second temperature sensor in the second step, the compensator may derive the compensation factors using the first temperature change, the second temperature change, and the temperature value measured by the third temperature sensor in the third step.

In addition, transmitting the compensation factors derived from the compensator to measuring unit of the radiosonde; and calculating the corrected temperature value using the transmitted compensation factors may further include.

In addition, in the case of flying the radiosonde, detecting the first temperature value using the first temperature sensor, and detecting the second temperature value using the second temperature sensor, the measuring unit may calculate the first temperature value and the corrected temperature value from the second temperature value using the compensation factors.

Meanwhile, in a program embodied instructions which may be executed by a digital processor in types in order to perform the measuring method of the radiosonde provided the first temperature sensor and the second temperature sensor having the higher emission ratio than the first temperature sensor, the measuring method of temperature related to an exemplary embodiment of the present disclosure includes the first step deriving the compensation factors; the second step flying the radiosonde; the third step detecting the first temperature value using the first temperature sensor and detecting the second temperature value using the second temperature sensor; and the fourth step that the measuring unit of the radiosonde calculates the corrected temperature value; but the first step further includes the step 1-1 installing the third temperature sensor configured to block out the radiosonde and light blazed from outside in the chamber; the step 1-2 outputting the light in the chamber using the sunlight simulator; the step 1-3 that the compensator derives the predetermined compensation factors related to calculation of the corrected temperature value; and the step 1-4 transmitting the compensation factors derived from the compensator to the measuring unit; the output light by the sunlight simulator in the step 1-2 induces the first temperature change detected by the first temperature sensor and the second temperature change detected by the second temperature sensor, in the step 1-3, the compensator may derive using the first temperature change, the second temperature change, and the temperature value measured by the third temperature sensor.

Meanwhile, in a program embodied instructions which may be executed by a digital processor in types in order to perform a correcting method of the radiosonde provided a plurality of temperature sensors, the correction method related to an exemplary embodiment of the present disclosure include a first step installing the radiosonde and the third temperature sensor in the chamber; a second step outputting the light in the chamber using the sunlight simulator; and a third step deriving the predetermined compensation factors related to calculate the corrected temperature value in the compensator; but the radiosonde is provided the first temperature sensor and the second temperature sensor having the higher emission ratio than the first temperature sensor, the third temperature sensor configured to block out the light blazed from the outside; the light output by the sunlight simulator in the second step induces the first temperature change detected by the first temperature sensor and the second temperature change detected by the second temperature sensor, the compensator may derive the compensation factors using the first temperature change, the second temperature change, and the temperature value measured by the third temperature sensor.

Advantageous Effects

The present disclosure may provide to an apparatus embodied in order to efficiently correct changing of measured temperature value in a temperature sensor according to influence of irradiance.

Specifically, the present disclosure can provide the user an apparatus and a method of correcting temperature variation due to irradiance by mounting two temperature sensors of the same type that are coated with materials having different emissivity and using difference of temperature values measured by the two temperature sensors.

In addition, the present disclosure may provide an apparatus and a method that can compensate the influence of the irradiance regardless of the area, time, and weather condition by applying thereof after observing the temperature difference of the two temperature sensors to be occurred according to the irradiance in advance, and realize very high precision to users.

Meanwhile, the technical objects to be achieved in the present disclosure are not limited to the aforementioned technical objects, and other not-mentioned technical objects will be obviously understood by those skilled in the art from the description below.

DESCRIPTION OF DRAWINGS

The following accompanied drawings in this specification illustrate preferred embodiments of the present disclosure and function to facilitate further understanding of the technical spirit of the present invention along with the detailed description of the invention. Accordingly, the present invention should not be construed as being limited to only contents illustrated in the drawings.

FIG. 1 is a schematic view of an upper air weather observation system in accordance with the present disclosure, FIGS. 2 and 3 illustrate an exemplary embodiment of structure of a radiosonde which is applicable to the present disclosure, FIGS. 4 and 5 illustrate an exemplary embodiment of a structure to derive compensator factors used for the radiosonde of the present disclosure, FIG. 6 is a flowchart illustrating an exemplary embodiment of a correction method of temperature change according to irradiance, FIG. 7 is a flowchart illustrating an exemplary embodiment of a method of deriving compensation factors according to the present disclosure, FIG. 8 illustrates a graph of temperature detected in temperature sensor according to change of the irradiance,

DESCRIPTION OF SYMBOLS

10: radiosonde
12: a first temperature sensor
14: a second temperature sensor
16: measuring unit
18: humidity sensor
20: a third temperature sensor
22: blocking panel
30: chamber
32: compensator
40: sunlight simulator
42: controller

BEST MODE

A radiosonde 10 of the present disclosure provides a first temperature sensor 12 and a second temperature sensor 14. The first temperature sensor 12 and the second temperature sensor 14 are configured to have a different emission ratio.

In addition, the radiosonde of the present disclosure provides a measuring unit 16 calculating a corrected temperature value.

Because the radiosonde 10 is influenced by outside irradiance, temperature values detected in the first temperature sensor 12 and the second temperature sensor 14 do not indicate accurate temperature.

The measuring unit 16 is transmitted the compensation factors derived from compensator 32 in order to compensate influence of the irradiance, and the measuring unit 16 may calculate the corrected temperature value using the compensation factors.

A correction system of the present disclosure installs the radiosonde 10 and the third temperature sensor 20 in the chamber. The third temperature sensor 20 is disposed in a blocking panel 22. Light output in a sunlight simulator 40 is reached the first temperature sensor 12 of the radiosonde 10 and the second temperature sensor 14, but the light is not reached the third temperature sensor 20 by the blocking panel 22.

Mode for Invention

Hereinafter, an exemplary embodiment of the present disclosure will be described in detail with reference to the accompanying drawings. In addition, an exemplary embodiment described in the following will not be construed as being limited to the detailed description of the present disclosure, and entire configuration described in the mode for the present disclosure are not deemed essential for solution of the present disclosure.

In addition, throughout the drawings, with reference to a description of relevant functions or action, like description of symbols will be used. Throughout the drawings, when an element is referred to 'connect' with other element, it can be 'directed connect' with other element of 'indirectly connected' in between other element may also be present.

Also, unless explicitly described to the contrary, the word "comprise" and variations such as "comprises" or "comprising" will be understood to imply the inclusion of stated elements but not the exclusion of any other elements.

<Configuration>

Hereinafter, a configuration of the present disclosure will be described in detail with reference to the accompanying drawings.

FIG. 1 is the schematic view of the upper air weather observation system in accordance with the present disclosure. Referring to FIG. 1, the upper air weather observation system may include a balloon 2, a radiosonde 10, a UHF antenna 4, and PC 6.

The balloon 2 is filled with helium and other gases, and flies the radiosonde 10 to weather observation location in order to observe the weather.

The radiosonde 10 observes weather condition of atmosphere by connecting with the balloon 2, and transmits wirelessly the observed weather condition data with its location information to a ground by modulating it into Gaussian frequency-shift keying (GFSK) system etc.

The UHF antenna 4 receives the transmitted weather condition information and the location information from the radiosonde 10 by modulating it into the frequency hopping spread spectrum system. In this case, the UHF antenna 4 may be configured with a directional antenna and a nondirectional antenna in pairs.

A method of Wireless signal demodulation transmits weather condition data like a frequency hopping spread spectrum system and the location information received from the UHF antenna 4 to a computer 6 which analyzes the weather condition data by demodulating them into digital data.

The computer 6 stores, analyzes weather observation data of the upper air transmitted from the radiosonde 10, and converts them into a form needed at a weather station. Converted data may be printed through a printer or may be displayed on a monitor, or may be transmitted by an intranet to the weather station through a hub connected to a computer.

Meanwhile, FIGS. 2 and 3 illustrate an exemplary embodiment of the structure of the radiosonde which is applicable to the present disclosure.

The radiosonde 10 of the present disclosure is provided the first temperature sensor 12 and the second temperature sensor 14.

Unlike the conventional radiosonde, the present disclosure uses two temperature sensors; however, in consideration of cost of temperature sensor, it may be economically feasible.

The temperature sensor 12 and the second temperature sensor 14 are configured to be had the different emission ratio.

For example, the first temperature sensor 12 is a sensor having a metal surface with very low emission ratio.

The first temperature sensor 12 may use a thermocouple such as E-type and K-type. Alternatively, a platinum resistance temperature sensor surface treated to have high reflectivity or a thermistor may be used.

The second temperature sensor 14 has a same material with the first temperature sensor 12; however, material having high emission ratio like carbon black is coated on the surface. The second temperature sensor 14 is manufactured to show the greatest temperature rising effect by sunlight.

The measuring unit 16 functions to calculate the corrected temperature value. Because the radiosonde 10 is influenced by the outside irradiance, temperature values detected in the first temperature sensor 12 and the second temperature sensor 14 do not indicate the accurate temperature.

The measuring unit 16 is transmitted the compensation factors derived from compensator 32 in order to compensate the influence of the irradiance, and the measuring unit 16 calculates the corrected temperature value using the compensation factors.

A humidity sensor 18 senses humidity in the upper. As the humidity sensor 18, a polymer thin film humidity sensor may be used. The polymer thin film humidity sensor measures capacitance using polymer thin film capacitance, if moisture in the air permeates into a polymer thin film, the capacitance increases, and if the moisture is low, the capacitance decreases, therefore the humidity may be measured using thereof.

The radiosonde 10 may further include other sensors like an atmospheric pressure sensor and an illumination sensor apart from the temperature sensor 12, 14 and the humidity sensor 18.

Meanwhile, FIGS. 4 and 5 illustrate an exemplary embodiment of the structure to derive the compensator factors used for the radiosonde of the present disclosure.

Referring to FIGS. 4 and 5, the radiosonde 10 and the third temperature sensor are installed in the chamber 30. The third temperature sensor 20 is preferred to be manufactured same material as the first temperature sensor 12 and the second temperature sensor 14.

The light irradiated from outside reaches the radiosonde 10. In the case that the light is output in the sunlight simulator 40 by control of a controller 42, the light output in the sunlight simulator 40 travels in the direction of the first temperature sensor 12 and the second temperature sensor 14.

The third temperature sensor 20 is configured to block out the light blazed from outside. For example, the third temperature sensor 20 is positioned in the blocking panel 22, and the light output in the sunlight simulator 40 cannot reach the third temperature sensor 20 by the blocking panel 22.

The controller 42 controls output of the sunlight simulator 40. The light output by the sunlight simulator 40 induces the first temperature change detected by the first temperature sensor 12 and the second temperature change detected by the second temperature sensor 14.

Particularly, the controller 42 may change the illumination of the light output in the sunlight simulator 40 within the predetermined testing scope in order to derive the compensation factors.

The compensator 32 is a configuration deriving the compensation factors. The compensator 32 may derive the compensation factors using the first temperature change, the second temperature change, and the temperature value measured by the third temperature sensor 20.

The compensator 32 observes the temperature value detected by the first temperature sensor 12 in arbitrary the first illumination within the testing scope, the temperature value detected by the second temperature sensor 14, and the temperature value detected by the third temperature sensor 30.

<Manufacturing Method>

Hereinafter, an operation of the present disclosure will be described in detail with reference to the accompanying drawings.

FIG. 6 is the flowchart illustrating an exemplary embodiment of the correction method of the temperature change according to the irradiance, and FIG. 7 is the flowchart illustrating an exemplary embodiment of the method of the deriving compensation factors according to the present disclosure.

Referring to FIG. 6, first, the compensation factors are derived in the compensator 32 (S10). The S10 step is conducted on the ground before flying the radiosonde 10. A detailed process of the S10 step is illustrated in FIG. 7.

Referring to FIG. 7, the radiosonde 10 and the third temperature sensor 20 are installed in the chamber 30 (S2). The third temperature sensor 20 is positioned in the blocking panel 22 to block out the light blazed from outside.

Further, the light is output in the chamber 30 using the sunlight simulator 40 (S4). The light output in the sunlight simulator 40 is reached the first temperature sensor 12 and the second temperature sensor 14 of the radiosonde 10. The light output in the sunlight simulator 40 does not reach the third temperature sensor 20.

The controller 42 controls the output of the sunlight simulator 40. The illumination of the light output in the sunlight simulator 40 is changed within the testing scope. The compensator 32 observes the temperature value detected by the first temperature sensor 12 in arbitrary the first illumination within the testing scope, the temperature value detected by the second temperature sensor 14, and the temperature value detected by the third temperature sensor 30.

Further, the compensator 32 derives the predetermined compensation factors, and the compensation factors derived in the compensator 32 are transmitted to the measuring unit 16 (S6). The radiosonde 10 stores the compensation factors in the measuring unit 16, and the stored compensation factors are used for calculation of the temperature value which is compensated later.

With reference to this, FIG. 8 illustrates the graph of the temperature detected in the temperature sensor according to the change of the irradiance. FIG. 8 illustrates an example indicating linear temperature change according to the change of the irradiance; however, unlike FIG. 8, indicating nonlinear temperature change like curved shapes may be possible.

Referring to FIG. 8, in the initial illumination without output in the sunlight simulator 40, temperature detected in the first temperature sensor 12, the second temperature sensor 14, and the third temperature sensor 20 are same. When the illumination of the light output in the sunlight simulator is changed, the temperature value detected in the first temperature sensor 12 and the second temperature sensor 14 are changed.

The temperature value detected by the first temperature sensor 12 in arbitrary the first illumination may be expressed as in the following formula 1.

$$t_1=t_3+\Delta t_r=t_3+a+b\times R_i \qquad \text{Formula 1}$$

In the above formula 1, $t_1$ is the temperature value detected by the first temperature sensor 12 in the first illumination, $t_3$ is the temperature value detected by the third temperature sensor 20, a is one of the compensation factors, b is one of the compensation factors, and $R_i$ is the first illumination.

The temperature value detected by the second temperature sensor 14 in the first illumination may be expressed as in the following formula 2.

$$t_2=t_1+\Delta t_s=t_1+c+d\times R_i \quad \text{Formula 2}$$

In the above formula 2, $t_2$ is the temperature value detected by the second temperature sensor 14 in the first illumination, c is one of the compensation factors, and d is one of the compensation factors.

The compensation factors a, b, c, and d of the above formula 1 and the formula 2 may be obtained from experiment processes of the temperature sensor 12, 14, and 20 using the sunlight simulator 40.

The following formula 3 may be derived when the formula 1 and the formula 2 are proved.

$$t_3 = t_1 - \left\{a + b\left(\frac{t_2 - t_1 - c}{d}\right)\right\} \quad \text{Formula 3}$$

Unlike FIG. 8, in the case that the temperature change is indicated nonlinearly, the formula 1 and the formula 3 may not be applied, the formula 2 or the formula 3 may have quadratic form or cubic form.

In this case, deriving the compensation factors by changing the output of the sunlight simulator 40 within the testing scope may be possible. That is, the compensator 32 observes the temperature value detected by the first temperature sensor 12 in the first illumination, the temperature value detected by the second temperature sensor 14, and the temperature value detected by the third temperature value 20, and an approximated function with reference to the temperature value detected by the first temperature sensor 12 and the temperature value detected by the second temperature sensor 14 may be obtained.

FIG. 6 is referred again. Further, the radiosonde 10 provided the first temperature sensor 12 and the second temperature sensor 14 flies (S20). As described above, the first temperature sensor 12 is configured to have the low emission ratio, and the second temperature sensor 14 is configured to have the high emission ratio.

Further, the first temperature value is detected using the first temperature sensor 12, and the second temperature value is detected using the second temperature sensor 14 (S30).

Further, the measuring unit 16 of the radiosonde 10 calculates the first temperature value and the temperature value corrected from the second temperature value using the compensation factors (S40). When using the formula 3, the following formula 4 may be derived, and the measuring unit 16 calculates the corrected temperature value using the formula 4.

$$T_{air} = T_1 - \left\{a + b\left(\frac{T_2 - T_1 - c}{d}\right)\right\} \quad \text{Formula 4}$$

In the above formula 4, $T_{air}$ is the corrected temperature value, $T_1$ is the first temperature value, and $T_2$ is the second temperature value.

Meanwhile, the present disclosure may be embodied in computer readable media as a computer readable code. The computer readable media includes all kinds of recording devices stored readable data by computer system. Examples of the computer readable recording media are ROM, RAM, CD-ROM, a magnetic tape, a floppy disk, and optical data storage device, and an embodiment in the form of carrier wave (for example, transmission through the Internet) are included. In addition, the computer readable recording media is dispersed to computer system connected to network, and the computer readable code may be stored in dispersed method and be performed. In addition, a functional program, code, and code segments in order to embody the present disclosure are easily deduced by programmers in the art.

In addition, aforementioned apparatus and method are not applied limitedly to the above-mentioned configuration and method of exemplary embodiments, but may be freely varied through the combination of the whole or a portion thereof.

The invention claimed is:

1. A radiosonde air temperature measurement correction system comprising:

a radiosonde for measuring air temperature while being flown in the atmosphere, the radiosonde including a first temperature sensor with a first emission ratio and a second temperature sensor having a second emission ratio, the second emission ratio being higher than the first emission ratio, the radiosonde further including a measuring unit coupled to the first temperature sensor for receiving a first temperature reading and coupled to the second temperature sensor for receiving a second temperature reading while the radiosonde is being flown;

a chamber adapted to have placed therein the radiosonde;

a sunlight simulator connected to the chamber for illuminating the chamber with light of a selected irradiance;

a third temperature sensor disposed in the chamber and shielded from the light emitted by the sunlight simulator; and a compensator coupled to the chamber for receiving a first temperature value from the first temperature sensor, a second temperature value from the second temperature sensor and a third temperature value from the third temperature sensor, the third temperature value differing from the first temperature value and the second temperature value differing from the first temperature value as functions of the selected irradiance, the compensator deriving a plurality of compensation factors as a function of the first temperature value, the second temperature value, the third temperature value, and the selected irradiance;

the compensator transmitting the compensation factors to the measuring unit of the radiosonde, the measuring unit of the radiosonde deriving a corrected air temperature from the first and second temperature readings using the compensation factors while the radiosonde is being flown.

2. The correction system of claim 1, further comprising a controller coupled to the sunlight simulator for varying the irradiance of the light emitted by the sunlight simulator within a predetermined testing scope, the compensator constructing an approximated function of temperature change versus irradiance in which the plurality of compensation factors is used.

3. The correction system of claim 1, wherein the relationship between the first temperature value and the third temperature value is given by a first formula $$t_1=t_3+a+b\times R_i$$

wherein $t_1$ is the first temperature value as detected by the first temperature sensor when exposed to the selected irradiance, $t_3$ is the third temperature value as detected by the third temperature sensor, a is one of the compensation factors, b is one of the compensation factors, and $R_i$ is the selected irradiance.

4. The correction system of claim 3, wherein the relationship of the second temperature value as detected by the second temperature sensor when exposed to the selected irradiance is given by a second formula $$t_2 = t_1 + c + d \times R_i$$

wherein $t_2$ is the second temperature value as detected by the second temperature sensor when exposed to the selected irradiance, c is one of the compensation factors, and d is one of the compensation factors.

5. The correction system of claim 4, wherein the measuring unit calculates the corrected air temperature value using a third formula $$T_{air} = T_1 - \left\{a + b\left(\frac{T_2 - T_1 - c}{d}\right)\right\}$$

wherein $T_{air}$ is the corrected air temperature, $T_1$ is the first temperature reading, and $T_2$ is the second temperature reading.

6. A method for correcting air temperature readings made by a flying radiosonde, the method comprising the steps of:

providing a radiosonde having a first temperature sensor with a first emission ratio, a second temperature sensor with a second emission ratio that is higher than the first emission ratio, and a measuring unit coupled to the first temperature sensor for receiving a first temperature reading and coupled to the second temperature sensor for receiving a second temperature reading;

providing a chamber with a third temperature sensor;

placing the radiosonde in the chamber;

illuminating the chamber with light emitted from a sunlight simulator, the light having a selected irradiance;

shielding the third temperature sensor from the light emitted by the sunlight simulator;

while the radiosonde is in the chamber, using a compensator to receive a first temperature value from the first temperature sensor, a second temperature value from the second temperature sensor and a third temperature value from the third temperature sensor;

using the compensator to derive a plurality of compensation factors as a function of the first temperature value, the second temperature value, the third temperature value and the selected irradiance;

removing the radiosonde from the chamber;

transmitting, from the compensator to the measuring unit, the plurality of compensation factors;

storing, by the measuring unit, the plurality of compensation factors;

flying the radiosonde;

while flying the radiosonde, receiving, by the measurement unit, the first temperature reading from the first temperature sensor, while flying the radiosonde, receiving, by the measurement unit, the second temperature reading from the second temperature sensor; and calculating, by the measurement unit, a corrected air temperature using the first temperature reading, the second temperature reading and the stored compensation factors.

7. The method of claim 6, further including the steps of using a controller to vary the selected irradiance of the light emitted by the sunlight simulator; and using the compensator to construct an approximated function of temperature change versus irradiance in which the plurality of compensation factors is used.

* * * * *